United States Patent Office 2,732,369
Patented Jan. 24, 1956

2,732,369
POLYMERS OF N-2-NORCAMPHANYL-ACRYLAMIDES

John R. Caldwell and Edward H. Hill, Kingsport, Tenn., assignors to Eastman Kodak Company, Rochester, N. Y., a corporation of New Jersey No Drawing. Application August 4, 1954, Serial No. 447,900

20 Claims. (Cl. 260—82.1)

This invention relates to polymeric materials containing N-2-norcamphanylacrylamide or N-2-norcamphanylmethacrylamide, and to the preparation of such polymers.

In the preparation of films, fibers, molded objects and the like from polymeric materials, it is desirable that the polymers possess a relatively high melting point or softening or sticking temperature. Thus, for example, in the preparation of synthetic fibers, it is desirable that the fibers have a sticking temperature above about 150° C. and preferably about 200 C. Homopolymers of monomeric materials such as acrylonitrile, vinyl chloride and vinylidene chloride have been used, but it is often desirable to modify the properties of such polymers. In order to do this, attempts have been made to employ mixtures of polymeric materials, or to compound plasticizers and similar compounding ingredients with the polymers, or to copolymerize the monomer with another monomer in order to modify the undesirable characteristics such as poor solubility and the like. In many cases, particularly with acrylonitrile polymers, attempts to form mixtures are difficult because of the incompatibility of the polyacrylonitrile with other polymeric materials. This incompatibility often results in phase separation of the components as well as segmentation in fibers prepared from such mixtures. Although modified properties can be obtained by means of interpolymers, such as copolymers or terpolymers, the softening temperature of the copolymer is usually undesirably low.

It is accordingly an object of this invention to provide new and useful polymers containing N-2-norcamphanyl-acrylamides alone or interpolymerized with one or more of the well known polymerizable olefinic monomers, including both the vinylic and/or diolefinic monomers.

Another object of the invention is to provide new polymeric materials which are of particular utility in the manufacture of films, fibers, sheets, tubes, molded objects and the like.

Another object of the invention is to provide polymers containing N-2-norcamphanylacrylamide or methacrylamide and characterized by having unusually high melting points and sticking temperatures.

Other objects will be apparent from the description and claims which follow.

These and other objects are attained by means of this invention, which comprises homopolymerizing a monomer of the formula

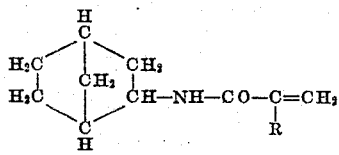

in which R is either hydrogen or a methyl group, or co-polymerizing either or both of the monomers included within the structural formula with one or more olefinic monomers containing an ethylenic linkage. The polymers embodying the invention include homopolymers of N-2-norcamphanylacrylamide or N-2-norcamphanylmethacrylamide, as well as interpolymers with a vinylic monomer containing a single monoethylenic group of the structure —CH=C< and desirably a single CH$_2$=C< group, as well as interpolymers with diolefinic monomers characterized by a

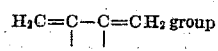

group

The N-2-norcamphanylacrylamides employed in practicing the invention can be readily prepared by reacting bicycloheptene with either acrylonitrile or methacrylonitrile in the presence of sulfuric acid. The preparation of such monomers is described in detail in the copending application of Caldwell and Poe, Serial No. 446,956, filed July 30, 1954.

These compounds are normally solid materials which homopolymerize readily. The homopolymer of N-2-norcamphanylacrylamide has a sticking temperature of 140–150° C., and the homopolymer of N-2-norcamphanylmethacrylamide has a sticking temperature of 170° C. Thus the homopolymers can be readily used for the preparation of films which have good optical properties and which are tough and high melting. They can also be used for the preparation of molded objects or sheets or tubes if desired. Although the homopolymers can be used in the preparation of synthetic fibers, fibers having most desirable properties are prepared from interpolymers of these monomers with other vinylic or diolefinic monomers. Unlike most interpolymers, the copolymers of the norcamphanylacrylamide monomers with such materials as the vinylic and diolefinic monomers give products which have extremely high melting points. For example, when up to 20% by weight of norcamphanylacrylamide monomer is copolymerized with more than 80% by weight of acrylonitrile, the resulting copolymer has the desirable properties of polyacrylonitrile but can be dyed much more readiy than polyacrylonitrile and, in contrast to the usual copolymers, has a softening temperature in the vicinity of 200° C. Thus the norcamphanylacrylamide monomers function to modify the undesirable property of polyacrylonitrile as regards dye affinity without producing a copolymer having limited utility because of a low softening temperature. Similarly improved results are obtained by interpolymerizing a norcamphanylacrylamide monomer with any of the other vinylic or diolefinic monomers such as butadiene and substituted butadienes, aromatic vinyl compounds such as styrene, vinyl halides such as vinyl chloride and vinylidene chloride, acrylates, methacrylates, acrylamides, methacrylamides, vinyl esters, vinyl ethers, vinyl ketones, vinyl pyridines, maleamides, fumaramides, citraconamides, itaconamides, maleamates, fumaramates, citraconamates, itaconamates, ethylenic hydrocarbons such as ethylene, acrylic acid, methacrylic acid, and similar well known olefin monomers. The norcamphanylacrylamides can be interpolymerized with one or more of such other olefinic monomers in any desired proportions from about 1% of the norcamphanylacrylamide component to about 99% of such component. Elastic or rubbery interpolymers are prepared using such diolefinic monomers as butadiene, isoprene, 2,3-dimethyl butadiene, 2-chloro butadiene, 2-cyano butadiene, 2-phenyl butadiene, and 2-acetoxy butadiene.

In practicing the invention, the copolymers of the norcamphanylacrylamide monomer with acrylonitrile or α-methylacrylonitrile are particularly useful. In addition to the copolymerizable olefinic monomers set out hereinabove, the diverse character of the vinylic and diolefinic monomers suitable for use in practicing the invention is illustrated by the fact that fluoro derivatives such as vinyl fluoride, vinylidene fluoride, tetrafluoroethylene and chloro-trifluoroethylene; N-vinyl imides, N-vinyl lactams, alkenyl esters such as isopropenyl acetate, and similar polymerizable monomers are all suitable for use. Highly useful monomers containing a —CH=C< group include the acrylamides (including methacrylamides), $C_4$–$C_{21}$ diamides of dicarboxylic acids of 4–5 carbon atoms such as maleamides, fumaramides, itaconamides and citraconamides, $C_4$–$C_{17}$ ester-amides of dicarboxylic acids of 4–5 carbon atoms such as maleamates, fumaramates, citraconamates and itaconamates, vinyl esters of monocarboxylic acids, acrylates, vinyl pyridines, vinylic halides such as vinyl chloride and vinylidene chloride, aryl vinyls such as styrene, α-methyl styrene, p-acetamino styrene, and α-acetoxy styrene, vinyl ethers such as ethyl vinyl ether and isopropyl vinyl ether, vinyl ketones such as isopropenyl methyl ketone, methyl vinyl ketone, ethyl vinyl ketone and ethyl isopropenyl ketone, unsaturated acids such as acrylic acid, methacrylic acid and the like, esters such as dimethyl maleate, diethyl maleate, diisopropyl maleate, dimethyl fumarate, diethyl fumarate, diisopropyl fumarate and the like, as well as such other vinylic monomers as fumaronitrile, methacrylonitrile, N-vinyl phthalimide, ethylene and similar materials have a monoethylenic unsaturation.

As acrylamides, we can advantageously use in our invention those represented by the following general formula:

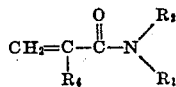

wherein $R_1$ and $R_2$ each represents a hydrogen atom or an alkyl group containing from 1 to 4 carbon atoms (e. g. methyl, ethyl, propyl, isopropyl, butyl, isobutyl, etc., groups) and $R_4$ represents a hydrogen atom or a methyl group. Typical acrylamides include, for example, acrylamide, N-methylacrylamide, N-ethylacrylamide, N-isopropylacrylamide, N-n-butylacrylamide, N,N-dimethylacrylamide, N,N-diethylacrylamide, methacrylamide, N-methylmethacrylamide, N-ethylmethacrylamide, N-isopropylmethacrylamide, N,N-dimethylmethacrylamide, etc.

As maleamides, we can advantageously use those represented by the following general formula:

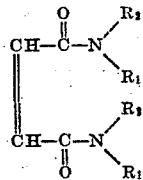

wherein $R_1$ and $R_2$ each have the values given above. Typical maleamides include, for example, maleamide, N-methylmaleamide, N-ethylmaleamide, N-propylmaleamide, N-isopropylmaleamide, N-n-butylmaleamide, N,N'-dimethylmaleamide, N,N'-diethylmaleamide, N,N'-di-n-butylmaleamide, N,N'-methylethylmaleamide, N,N'-tetramethylmaleamide, N,N'-tetraethylmaleamide, N,N'-dimethyl-N,N'-diethylmaleamide, etc.

As fumaramides, we can advantageously use those represented by the following general formula:

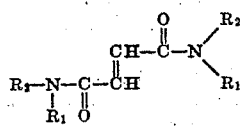

wherein $R_1$ and $R_2$ each have the values given above. Typical fumaramides include, for example, fumaramide, N-methylfumaramide, N-ethylfumaramide, N-propylfumaramide, N-isopropylfumaramide, N-n-butylfumaramide, N,N'-dimethylfumaramide, N,N'-diethylfumaramide, N,N'-di-n-butylfumaramide, N-ethyl - N' - methylfumaramide, N-n-butyl-N'-methylfumaramide, N,N'-tetramethylfumaramide, N,N'-tetraethylfumaramide, N,N'-diethyl-N',N'-dimethylfumaramide, etc.

As itaconamides, we can advantageously employ those represented by the following general formula:

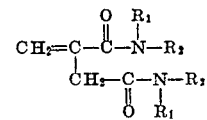

wherein $R_1$ and $R_2$ each have the values given above. Typical itaconamides include, for example, itaconamide, N-methylitaconamide, N-ethylitaconamide, N-propylitaconamide, N,N'-dimethylitaconamide, N,N'-diethylitaconamide, etc.

As citraconamides, we can advantageously employ those represented by the following general formula:

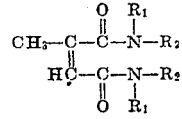

wherein $R_1$ and $R_2$ each have the values given above. Typical citraconacides include, for example, citraconamide, N-methylcitraconamide, N-ethylcitraconamide, N-n-butylcitraconamide, N,N'-dimethylcitraconamide, N,N'-diethylcitraconamide, the N,N'-butylcitraconamides, N,N'-tetramethylcitraconamide, etc.

The maleamates useful in practicing our invention comprise those represented by the following general formula:

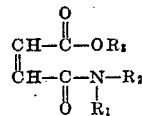

wherein $R_1$ and $R_2$ each have the values given above, and $R_3$ represents an alkyl group of from 1 to 4 carbon atoms (e. g., methyl, ethyl, propyl, isopropyl, n-butyl, isobutyl, etc.). Typical are methyl maleamate, propyl maleamate, N-methyl methyl maleamate, N-ethyl methyl maleamate, the N-butyl methyl maleamate, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, we can advantageously employ those represented by the following general formula:

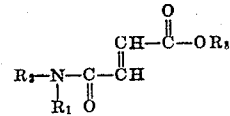

wherein $R_1$, $R_2$ and $R_3$ each have the values given above. Typical are methyl fumaramate, ethyl fumaramate, propyl fumaramate, n-butyl fumaramate, methyl N-methylfumaramate, ethyl N-methylfumaramate, the butyl N-methylfumaramates, methyl N-dimethylfumaramates, ethyl N-dimethylfumaramates, n-butyl N-dimethylfumaramate, the methyl N-dibutylfumaramates, etc.

As itaconamates, we can advantageously employ those represented by the following general formulas:

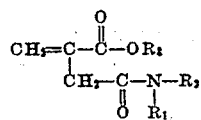

and

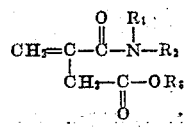

wherein R, $R_1$ and $R_3$ each have the values given above. Typical itaconamates include, for example, methyl itaconamate, ethyl itaconamate, propyl itaconamate, the butyl itaconamates, methyl N-methylitaconamate, ethyl N-methylitaconamate, propyl N-methylitaconamate, n-butyl N-methylitaconamate, methyl N-dimethylitaconamate, ethyl N-dimethylitaconamate, n-butyl N-dimethylitaconamate, the methyl N-dibutylitaconamates, etc.

As citraconamates, we can advantageously employ those represented by the following general formulas:

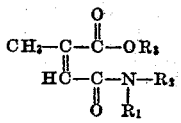

and

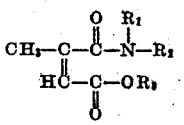

wherein $R_1$, $R_2$ and $R_3$ each have the values given above. Typical citraconamates include, for example, methyl citraconamate, ethyl citraconamate, propyl citraconamate, the butyl citraconamates, methyl N-methylcitraconamate, ethyl N-methylcitraconamates, propyl N-methylcitraconamates, n-butyl N-methylcitraconamate, methyl N-dimethylcitraconamate, ethyl N-dimethylcitraconamate, n-butyl N-dimethylcitraconamate, the methyl N-dibutylcitraconamates, etc.

As acrylates, we can advantageously employ those represented by the following general formula:

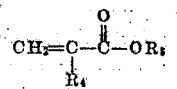

wherein $R_3$ has the values given above and $R_4$ represents a hydrogen atom, a methyl group, or an ethyl group. Typical acrylates includes, for example, methyl acrylate, ethyl acrylate, propyl acrylate, isopropyl acrylate, butyl acrylate, methyl methacrylate, ethyl methacrylate, propyl methacrylate, n-butyl methacrylate, isopropyl methacrylate, methyl ethacrylate, ethyl ethacrylate, etc.

As vinyl esters, we can advantageously employ those represented by the following general formula:

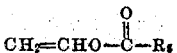

wherein $R_3$ has the values given above. Typical vinyl esters, include, for example, vinyl acetate, vinyl propionate, vinyl butyrate, vinyl isobutyrate, etc.

The polymerization is advantageously carried out in an aqueous medium, although other reaction media, such as organic solvents, can be employed; for example, a polymerization medium consisting of aqueous acetone, or other aqueous solvent can be used. The polymerization also proceeds satisfactorily in nonaqueous systems such as in the lower alcohols, ketones and esters, as well as in the aliphatic or aromatic hydrocarbons, dioxane, glycol monoethers, and the like. Mass or bulk polymerization can also be used.

The polymerizations can be accelerated by the use of a well known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e. g. alkali metal perborates, such as those of sodium and potassium, etc.) persulfate (e. g. alkali metal ammonium persulfate, etc.). Other catalysts such as the ketazines, azines, etc., can be used. The quantity of catalyst used can be varied, depending on the monomer, amount of diluent, etc.

The temperature of polymerization can be varied over the range of 20–130° C. depending upon the polymer being prepared, and temperatures of 40–60° C. are suitable in most cases. If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated esters, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc., bisulfites) can be added to reduce the time required for the polymerization to be effected.

The homopolymers and copolymers prepared in accordance with this invention can be extruded by the usual methods to give films, rods, tubes and the like. Photographically useful films can also be cast from solution in accordance with usual practice and used as film base materials for either black-and-white or color films wherein suitable emulsion layers are deposited on a supporting layer of the polymers of this invention. The polymers can also be dissolved in solvents and spun by wet or dry methods to give fibers. The compositions can also be molded by injection or compression methods to give a variety of molded objects.

In the manufacture of fibers, the copolymers are of particular utility since they have high sticking temperatures and good affinity for dyes. Thus, for example, when a norcamphanylacrylamide monomer is copolymerized with acrylonitrile or methacrylonitrile, particularly with the nitrile monomer predominating, the fibers possess the desirable characteristics of acrylonitrile fibers but with greatly enhanced dyeability and sticking temperatures in the vicinity of 200° C. Particularly useful copolymers comprise 80–99% acrylonitrile and 1–20% norcamphanylacrylamide. Other particularly useful fiber-forming copolymers comprise at least 50% by weight of vinyl or vinylidene chloride with N-2-norcamphanylacrylamide or methacrylamide. Highly elastic copolymers are formed with the butadiene monomers, and the products show excellent resistance to hydrocarbon solvents.

The homopolymers and copolymers embodying the invention can be prepared by either batch or continuous processes. The continuous processes can include continuous addition of either or both of the monomers, as well as continuous removal of polymer if desired. The polymers can then be compounded with the usual compounding ingredients if desired including pigments, fillers, dyes, plasticizers and the like in accordance with usual compounding practice. As with most synthetic fibers, the fibers prepared in accordance with this invention are desirably oriented by drafting at elevated temperatures, and preferably the fibers are hot drawn and relaxed before use.

The invention is illustrated by the following examples of certain preferred embodiments thereof, although it is not intended that the invention shall be limited by the illustrative embodiments unless otherwise specifically indicated.

*Example 1.—Homopolymer of N-(2-norcamphanyl) acrylamide*

Five g. of N-(2-norcamphanyl) acrylamide and 0.05 g. benzoyl peroxide were dissolved in 30 cc. of acetone and the solution was refluxed for 4 hours. The polymer separated from solution. It was washed with acetone and dried to give a yield of 4.0 g. The product was soluble in methylene chloride and ethylene dichloride. Films stuck to the hot bar at 140–150° C.

*Example 2.—Homopolymer of N-(2-norcamphanyl) methacrylamide*

Six g. of N-(2-norcamphanyl) methacrylamide and 0.06 g. benzoyl peroxide were dissolved in 40 cc. of ter-butyl alcohol and the solution was held at 50° C. for 24 hours. A viscous solution was obtained. Films cast from the solution were clear and tough. They stuck to the hot bar at 170° C.

*Example 3.—Homopolymer of N-(2-norcamphanyl) acrylamide*

Ten g. of N-(2-norcamphanyl) acrylamide, 0.1 g. potassium persulfate, and 0.2 g. sodium dodecyl sulfate were placed in a bottle with 100 cc. of water. The bottle was tumbled at 50° C. for 24 hours. The product was coagulated by adding sodium sulfate to the emulsion. It was washed with water and acetone. After drying, the yield was 8 g. The polymer was soluble in ethylene dichloride and gave a clear, tough film.

*Example 4.—Interpolymer of N-(2-norcamphanyl) acrylamide and acrylonitrile*

Twenty g. of acrylonitrile and 5 g. of N-(2-norcamphanyl) acrylamide were placed in a bottle and the following materials were added:

0.25 g. potassium persulfate
0.50 g. sodium octadecyl sulfate
0.05 g. ter-dodecyl mercaptan
200.0 cc. water The bottle was tumbled in a water bath at 50–55° C. for 20 hours. The product was coagulated with sodium sulfate, washed, and dried. It weighed 24 g. Analysis showed that it contained 20% of the N-(2-norcamphanyl) acrylamide. The product was soluble in dimethylformamide, dimethylacetamide, and γ-butyrolactone. It was soluble in a mixture of 2 parts acetonitrile–1 part dimethylformamide.

Ten parts of the interpolymer was dissolved in 40 parts dimethylformamide and the solution was extruded through a spinnerette into a precipitating bath composed of 70% water–30% dimethylformamide. The filaments were washed with water and drafted 400% at 120–130° C. The resulting fibers were strong and elastic. They stuck to the hot bar at 190° C. This is an unusually high sticking temperature for an acrylonitrile copolymer that contains 20% of a modifying monomer. The fibers dyed well with cellulose acetate dyes and acid wool dyes.

*Example 5.—Interpolymer of N-(2-norcamphanyl) methacrylamide and acrylonitrile*

An interpolymer was prepared as described in Example 4, except that the methacrylamide derivative was used in place of the acrylamide compound. The product had the same solubility as described in Example 4. Fibers made from the interpolymer dyed well with cellulose acetate dyes and acid wool dyes. They stuck to the hot bar at 190–200° C.

*Example 6.—Interpolymer of N-(2-norcamphanyl) acrylamide and acrylonitrile*

The following materials were placed in a bottle:

50.0 g. N-(2-norcamphanyl) acrylamide
50.0 g. acrylonitrile
1.0 g. azo-bis-isobutyronitrile
200.0 cc. ter-butyl alcohol The solution was heated at 50° C. for 24 hours. The product was filtered off, washed with methanol, and dried, to give a yield of 75 g. Analysis showed that it contained 53% acrylonitrile.

The product was soluble in acetonitrile. Films cast from the solution were clear and tough. They had a sticking temperature of 150–155° C. The films are useful in photography.

*Example 7.—Interpolymer of N-(2-norcamphanyl) acrylamide and methacrylonitrile*

The following materials were placed in a bottle:

10.0 g. N-(2-norcamphanyl) acrylamide
20.0 g. methacrylonitrile
0.5 g. sodium dodecyl sulfate
0.3 g. sodium persulfate
200.0 cc. water The mixture was tumbled at 50° C. for 48 hours. After washing and drying, the product weighed 26 g. It is useful as a molding plastic.

*Example 8.—Interpolymer of N-(2-norcamphanyl) acrylamide and vinyl chloride*

The following materials were placed in an autoclave:

60.0 g. N-(2-norcamphanyl) acrylamide
40.0 g. vinyl chloride
2.0 g. sulfonated mineral oil
1.0 g. potassium persulfate
800.0 cc. water The mixture was stirred at 60° C. for 18 hours. A yield of 87 g. product was obtained. The interpolymer was soluble in cyclohexanone and gave clear, tough films that are useful as photographic film base.

*Example 9.—Interpolymer of N-(2-norcamphanyl) methacrylamide and vinylidene chloride*

Using the method described in Example 8, an interpolymer was made from 80% vinylidene chloride and 20% N-(2-norcamphanyl) methacrylamide. The product was useful for the manufacture of fibers and bristles.

*Example 10.—Interpolymer of N-(2-norcamphanyl) methacrylamide and methyl methacrylate*

A product having the composition 65% N-(2-norcamphanyl) methacrylamide–35% methyl methacrylate is useful as a molding plastic.

*Example 11.—Interpolymer of N-(2-norcamphanyl) acrylamide and butadiene*

The following materials were placed in an autoclave:

25.0 g. N-(2-norcamphanyl) acrylamide
75.0 g. butadiene
3.0 g. soap
1.0 g. potassium persulfate
400.0 cc. water The mixture was stirred at 50–60° C. for 48 hours. The product is a rubber that shows improved resistance to hydrocarbon solvents.

*Example 12.—Interpolymer of N-(2-norcamphanyl) acrylamide and diethyl fumarate*

A product having the composition 70% N-(2-norcamphanyl) acrylamide–30% diethyl fumarate is useful as a molding plastic.

Similar results are obtained with other polymers within the scope of the invention.

Thus, by means of this invention, a new class of highly useful homopolymers and copolymers are readily prepared. The norcamphanylacrylamide monomers impart unusually high softening temperatures to interpolymers including such monomers in combined form, and also impart excellent dye affinity to polymers normally resistant to dyeing. The norcamphanyl acrylamides homopolymerize readily to useful products and interpolymerize in all proportions with any of the olefinic monomers, and all such homopolymers and copolymers are within the scope of this invention. The term "polymer" as used herein is intended to include both homopolymers and interpolymers.

Although the invention has been described in detail with particular reference to certain preferred embodiments, variations and modifications can be effected within the spirit and scope of the invention as described hereinabove and as defined in the appended claims.

We claim:

1. A polymer of an N-2-norcamphanylacrylamide monomer of the formula

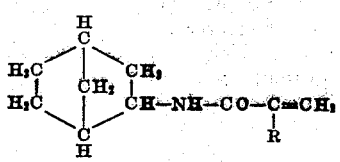

wherein R is selected from the group consisting of hydrogen and methyl groups.

2. A homopolymer of N-2-norcamphanylacrylamide.

3. A homopolymer of N-2-norcamphanylmethacrylamide.

4. An interpolymer of a monomer of the formula

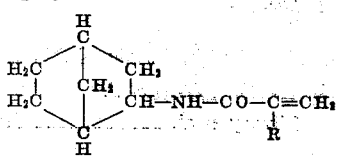

wherein R is selected from the group consisting of hydrogen and methyl groups, with at least one other olefinic monomer selected from the group consisting of copolymerizable monoolefinic and diolefinic monomers.

5. A copolymer of a monomer of the formula

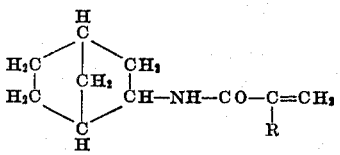

wherein R is selected from the group consisting of hydrogen and methyl groups, and a copolymerizable vinylic monomer characterized by a single —CH=C< group.

6. A copolymer of a monomer of the formula

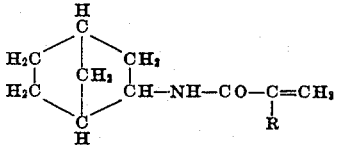

wherein R is selected from the group consisting of hydrogen and methyl groups, and a copolymerizable diolefinic monomer characterized by a

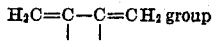

7. A copolymer of a monomer of the formula

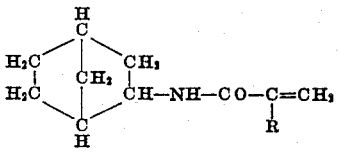

and a monomer of the formula

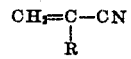

wherein each R is selected from the group consisting of hydrogen and methyl groups.

8. A copolymer of a monomer of the formula

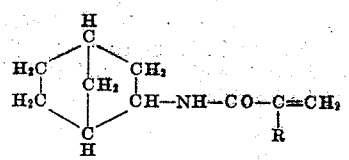

wherein R is selected from the group consisting of hydrogen and methyl groups, and a monoethylenic chloride containing two carbon atoms.

9. A copolymer of a monomer of the formula

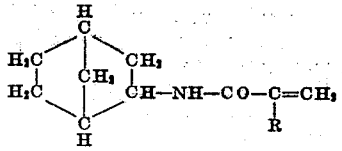

wherein R is selected from the group consisting of hydrogen and methyl groups, and a butadiene monomer copolymerizable therewith.

10. A copolymer of at least about 80% by weight of acrylonitrile and not more than about 20% by weight of N-2-norcamphanylacrylamide.

11. A copolymer of at least about 80% by weight of acrylonitrile with up to about 20% by weight of N-2-norcamphanylmethacrylamide.

12. A copolymer of at least 50% by weight of acrylonitrile with a monomer of the formula

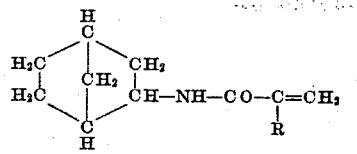

wherein R is selected from the group consisting of hydrogen and methyl groups.

13. A copolymer of N-2-norcamphanylacrylamide and butadiene.

14. The method which comprises polymerizing in the presence of a polymerization catalyst a monomer of the formula

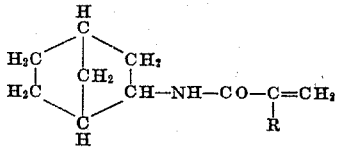

wherein R is selected from the group consisting of hydrogen and methyl groups.

15. The method which comprises interpolymerizing in the presence of a polymerization catalyst a dispersion of a monomer of the formula

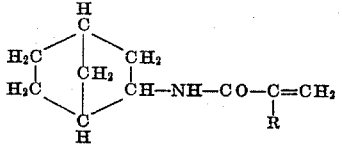

wherein R is selected from the group consisting of hydrogen and methyl groups, and a copolymerizable olefinic monomer.

16. The method which comprises copolymerizing in the presence of a polymerization catalyst a dispersion of a monomer of the formula

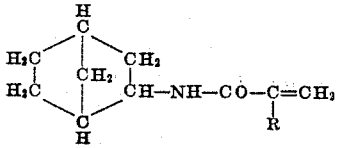

wherein R is selected from the group consisting of hydrogen and methyl groups and a copolymerizable vinylic monomer characterized by a single —CH=C< group.

17. The method which comprises copolymerizing in the presence of a polymerization catalyst a dispersion of a monomer of the formula

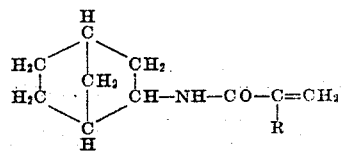

wherein R is selected from the group consisting of hydrogen and methyl groups, and a copolymerizable diolefinic monomer characterized by a

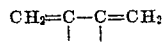

group.

18. The method which comprises polymerizing in a dispersion and in the presence of a polymerization catalyst a mixture of acrylonitrile and a monomer of the formula

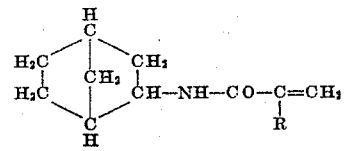

wherein R is selected from the group consisting of hydrogen and methyl groups.

19. The method which comprises polymerizing in a dispersion and in the presence of a polymerization catalyst a mixture of a monomer of the formula

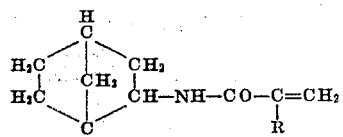

wherein R is selected from the group consisting of hydrogen and methyl groups, and a monoethylenic chloride containing two carbon atoms.

20. The method which comprises polymerizing in a dispersion and in the presence of a polymerization catalyst a mixture of butadiene and a monomer of the formula

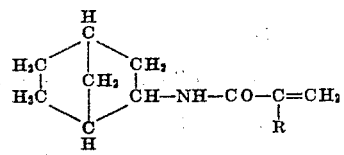

wherein R is selected from the group consisting of hydrogen and methyl groups.

References Cited in the file of this patent
UNITED STATES PATENTS
2,653,975    Mowry et al.  ----------- Sept. 29, 1953